(12) United States Patent
Andrianov et al.

(10) Patent No.: US 10,616,784 B2
(45) Date of Patent: Apr. 7, 2020

(54) METHODS AND APPARATUS FOR MANAGEMENT OF DATA PRIVACY

(71) Applicant: Nokia Solutions and Networks Oy, Espoo (FI)

(72) Inventors: Anatoly Andrianov, Schaumburg, IL (US); Sean Kelley, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 365 days.

(21) Appl. No.: 15/609,584

(22) Filed: May 31, 2017

(65) Prior Publication Data

US 2017/0272969 A1   Sep. 21, 2017

Related U.S. Application Data

(63) Continuation of application No. 13/586,217, filed on Aug. 15, 2012, now Pat. No. 10,045,241.

(60) Provisional application No. 61/523,618, filed on Aug. 15, 2011.

(51) Int. Cl.
*G06F 15/16* (2006.01)
*H04W 24/10* (2009.01)

(52) U.S. Cl.
CPC .................... *H04W 24/10* (2013.01)

(58) Field of Classification Search
CPC .................................................. H04W 24/10
See application file for complete search history.

(56) References Cited

U.S. PATENT DOCUMENTS

| 8,391,887 B2 | 3/2013 | Suzuki et al. ............. 455/456.1 |
| 8,442,556 B2 | 5/2013 | Rawat et al. .............. 455/456.2 |
| 8,577,360 B2 | 11/2013 | Olsson ........................ 455/423 |
| 8,594,671 B2 | 11/2013 | Wu .............................. 455/436 |
| 8,676,207 B2 | 3/2014 | Takahashi et al. ........... 455/436 |
| 8,731,543 B2 | 5/2014 | Jung et al. .................... 455/423 |
| 8,731,550 B2 | 5/2014 | Radulescu et al. ........... 455/434 |
| 8,768,335 B2 | 7/2014 | Yi et al. ..................... 455/422.1 |
| 9,220,029 B2* | 12/2015 | Wu ....................... H04W 60/06 |
| 2004/0199789 A1 | 10/2004 | Shaw et al. ................... 713/201 |
| 2007/0226701 A1 | 9/2007 | Suonvieri et al. ............ 717/128 |
| 2008/0233946 A1 | 9/2008 | Henry ........................ 455/422.1 |
| 2010/0093308 A1 | 4/2010 | Cohan .......................... 455/405 |

(Continued)

OTHER PUBLICATIONS

Nokia Siemens Networks; "Adding user consent handling in MDT activation; Change Request, 32.422 CR 0107, rev 3 Current version 10.2.1"; 3GPP TSG SA Meeting #51; Mar. 21-23, 2011; whole document (6 pages); Kansas City, USA.

(Continued)

*Primary Examiner* — Michael A Keller
*Assistant Examiner* — Jsing Forng Lin
(74) *Attorney, Agent, or Firm* — Harrington & Smith

(57) ABSTRACT

Systems and techniques for managing user data privacy are described. Upon identification of a user device as a candidate for performing data collection relating to network performance experienced by the device, a network operator on whose behalf the data collection is to be performed is identified, and user consent information associated with the user device is examined to determine if a user of the device has given consent for data collection on behalf of the network operator. If the user has given consent, the user device is configured for data collection.

22 Claims, 5 Drawing Sheets

(56) References Cited

U.S. PATENT DOCUMENTS

| | | | |
|---|---|---|---|
| 2011/0183661 A1 | 7/2011 | Yi et al. | 455/422.1 |
| 2011/0183662 A1 | 7/2011 | Lee et al. | 455/422.1 |
| 2011/0195668 A1 | 8/2011 | Lee et al. | 455/67.11 |
| 2011/0201324 A1 | 8/2011 | Persson et al. | 455/422.1 |
| 2012/0089876 A1 | 4/2012 | Racz | 714/45 |
| 2012/0155390 A1 | 6/2012 | Ou et al. | 370/328 |
| 2013/0178211 A1* | 7/2013 | Wang | H04W 24/02 455/436 |
| 2014/0099940 A1 | 4/2014 | Kim et al. | 455/422.1 |

OTHER PUBLICATIONS

"Reply LS on MDT user involvement, Release 10; S3-110185"; 3GPP TSG-SA WG3 Meeting #62; Jan. 24-28, 2011; whole document (2 pages); Ljubljana, Slovenia.

Nokia Siemens Networks; "Considerations about user consent in case of area or management based MDT activation; SP-110187"; 3GPP TSG SA Meeting #51; Mar. 21-23, 2011; whole document (2 pages); Kansas City, USA.

3GPP TS 32.422 V11.0.0 (Jun. 2011), "3$^{rd}$ Generation Partnership Project, Technical Specification Group Services and System Aspects, Telecommunication Management Subscriber and Equipment Trace; trace control and configuration management (Release 11)".

S5-113825, Huawei et al, "Super CR for combination of: 1. Modify MDT log retrieval procedures to protect user privacy and prevent network spying; 2. Support multiple cells in area based MDT", 3GPP TSG SA WG5 Meeting #80; Nov. 14-18, 2011; San Francisco, USA.

"3$^{rd}$ Generation partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", 3GPP TS 37.320 V10.4.0, Dec. 2011, 18 pgs.

"3$^{rd}$ Generation Partnership Project; Technical Specification Group Radio Access (E-UTRA); Radio Resource Control (RRC); Protocol specification (Release 11)", 3GPP TS 36.11 V11.0.0, Jun. 2012, 302 pgs.

"3$^{rd}$ Generation Partnership Project; Technical Specification Group Core Network and Terminals; Non-Access-Stratum (NAS) protocol for Evolved Packet System (EPS); Stage 3 (Release 11)", 3GPP TS 24.301 V11.3.0, Jun. 2012, 335 pgs.

"3$^{rd}$Generation Partnership Project; Technical Specification Group Radio Access Network; Radio Resource Control (RRC); Protocol specification (Release 11)", 3GPP TS 25.331 V11.2.0, Jun. 2012, 1944 pgs.

"3$^{rd}$ Generation Partnership Project; Technical Specification group Services and system Aspects; Telecommunication management; Subscriber and equipment trace; Trace control and configuration management (Release 11)", 3GPP TS 32.422 V11.4.0, Jun. 2012, 122 pgs.

\* cited by examiner

METHODS AND APPARATUS FOR MANAGEMENT OF DATA PRIVACY

CROSS-REFERENCE TO RELATED APPLICATIONS

This application is a continuation of parent U.S. patent application Ser. No. 13/586,217 (filed on Aug. 15, 2012), and claims further priority to U.S. Provisional Application Ser. No. 61/523,618 (filed Aug. 15, 2011) through that parent application. Both of those priority documents are incorporated by reference herein in their entirety.

FIELD OF THE INVENTION

The present invention relates generally to wireless communication. More particularly, the invention relates to management of data sharing by a wireless device operating in a network comprising elements shared between two or more operators.

BACKGROUND

Following is a list of definitions of abbreviations found in the application.
3GPP—Third Generation Preferred Partnership
CN—core network
EHPLMN—equivalent home public land mobile network
EM—element manager
eNB—eNodeB
ePLMN—equivalent public land mobile network
HPLMN—home public land mobile network
HSS—home subscriber server
LTE—long term evolution
MDT—minimization of drive tests
MME—mobility management entity
OA & M—operations, administration, and maintenance
PLMN—public land mobile network
RAN—radio access network
RPLMN—registered PLMN
RSRP—reference signal received power
RSRQ—reference signal received quality
SINR—signal to interference and noise ratio
TCE—trace collection entity
UMTS—Universal Mobile Terrestrial Service Wireless network operators are strongly motivated to use resources in an efficient way, both in order to maximize their own profit and to provide services to customers at a reasonable price. Network optimization, that is, the placement and configuration of resources so as to maximize the area in which coverage is provided and the quality of service provided by that coverage, contributes greatly to the efficient use of resources. One way in which operators carry out network optimization is through drive testing, in which employees of an operator carry a device, such as a typical user device, through the service area of a network. The device is usually carried in an automobile, and as the employee drives to various points within the service area, the device collects data relating to the quality of the service that is being made available to it. Drive testing is obviously costly, and the unnecessary use of automobiles contributes to air pollution and also presents some measure of personal danger to the employees performing the testing, because the possibility of traffic accidents is always present.

In order to minimize drive testing, operators are more and more turning to mechanisms that take advantage of the fact that customer devices are constantly receiving service in numerous locations throughout their service areas and that receiving information relating to the service experience of multiple devices can substitute for drive testing in many cases and can reduce or eliminate the need for drive testing. Third Generation Preferred Partnership (3GPP) long term evolution (LTE) and universal mobile terrestrial service (UMTS) release 10 includes a feature called "Minimization of Drive Tests" (MDT), which provides the ability for operators to gather information such as radio measurements which are associated with customer UEs and use this information to assist network optimization.

Another mechanism directed to the efficient use of resources is radio access network (RAN) sharing, in which two or more core network operators share a radio access network. Sharing of radio access network resources can reduce duplication of resources while allowing each participating core network operator to serve its customers and to provide features and pricing desired by its customers in comparison to the features and pricing offered by other core network operators sharing the radio access network.

SUMMARY OF THE INVENTION

In one embodiment of the invention, a method comprises receiving information identifying a user device as a candidate for performing data collection relating to network performance experienced by the user device, receiving information identifying a network operator on behalf of whom the data collection is to be performed, receiving information indicating consent status of a user device, wherein the consent status of the user device indicates whether or not a user of the user device has given consent for data collection on behalf of the network operator and, if the information indicating consent status of the user device indicates consent for data collection on behalf of the network operator, configuring the user device for the data collection.

In another embodiment of the invention, a method comprises, at initial configuration of a user device for collecting and logging of data relating to network conditions experienced by the user device, storing an identifier indicating an operator on behalf of whom the data is to be collected, and delivering the logged data only to an entity associated with the stored identifier.

In another embodiment of the invention, a method comprises receiving a data collection activation message, wherein the data collection is associated with a data storage server, determining at least one network identity of the network where the data storage server resides, determining at least one network identity of the network where a consent status of a candidate user device indicates consent for data collection, comparing the at least one network identity of the network where the data storage server resides with the at least one network identity of the network where the consent status of the candidate user device indicates consent and, only in case of at least one match, configuring the candidate user device for data collection.

In another embodiment of the invention, an apparatus comprises at least one processor and memory storing computer program code. The memory storing the computer program code is configured to, with the at least one processor, cause the apparatus to at least receive information identifying a user device as a candidate for performing data collection relating to network performance experienced by the user device, receive information identifying a network operator on behalf of whom the data collection is to be performed, receive information indicating consent status of a user device, wherein the consent status of the user device indicates whether or not a user of the user device has given consent for data collection on behalf of the network operator and, if the information indicating consent status of the user device indicates consent for data collection on behalf of the network operator, configure the user device for the data collection.

In another embodiment of the invention, an apparatus comprises at least one processor and memory storing computer program code. The memory storing the computer program code is configured to, with the at least one processor, cause the apparatus to at least, at initial configuration of a user device for collecting and logging of data relating to network conditions experienced by the user device, store an identifier indicating an operator on behalf of whom the data is to be collected, and deliver the logged data only to an entity associated with the stored identifier.

In another embodiment of the invention, an apparatus comprises at least one processor and memory storing computer program code. The memory storing the computer program code is configured to, with the at least one processor, cause the apparatus to at least receive a data collection activation message, wherein the data collection is associated with a data storage server, determine at least one network identity of the network where the data storage server resides, determine at least one network identity of the network where a consent status of a candidate user device indicates consent for data collection, compare the at least one network identity of the network where the data storage server resides with the at least one network identity of the network where the consent status of the candidate user device indicates consent and, only in case of at least one match, configure the candidate user device for data collection.

In another embodiment of the invention, a computer readable medium stores a program of instructions. Execution of the program of instructions by a processor configures an apparatus to at least receive information identifying a user device as a candidate for performing data collection relating to network performance experienced by the user device, receive information identifying a network operator on behalf of whom the data collection is to be performed, receive information indicating consent status of a user device, wherein the consent status of the user device indicates whether or not a user of the user device has given consent for data collection on behalf of the network operator and, if the information indicating consent status of the user device indicates consent for data collection on behalf of the network operator, configure the user device for the data collection.

In another embodiment of the invention, a computer readable medium stores a program of instructions. Execution of the program of instructions by a processor configures an apparatus to at least, at initial configuration of a user device for collecting and logging of data relating to network conditions experienced by the user device, store an identifier indicating an operator on behalf of whom the data is to be collected, and deliver the logged data only to an entity associated with the stored identifier.

In another embodiment of the invention, a computer readable medium stores a program of instructions. Execution of the program of instructions by a processor configures an apparatus to at least receive a data collection activation message, wherein the data collection is associated with a data storage server, determine at least one network identity of the network where the data storage server resides, determine at least one network identity of the network where a consent status of a candidate user device indicates consent for data collection, compare the at least one network identity of the network where the data storage server resides with the at least one network identity of the network where the consent status of the candidate user device indicates consent and, only in case of at least one match, configure the candidate user device for data collection.

In another embodiment of the invention, a method comprises determining a public land mobile network identifier associated with a trace collection entity, determining if information associated with a user device indicates authorization for delivery of information to a network operator associated with the public land mobile network identifier, and requesting collected data from the user device only if the information associated with the device indicates authorization for delivery of information to a network operator associated with the public land mobile network identifier.

In another embodiment of the invention, an apparatus comprises at least one processor and memory storing a program of instructions. The program of instructions is configured to, with the at least one processor, cause the apparatus to determine a public land mobile network identifier associated with a trace collection entity, determine if information associated with a user device indicates authorization for delivery of information to a network operator associated with the public land mobile network identifier and request collected data from the user device only if the information associated with the device indicates authorization for delivery of information to a network operator associated with the public land mobile network identifier.

In another embodiment of the invention, a computer readable medium stores a program of instructions. Execution of the program of instructions by a processor configures an apparatus to determine a public land mobile network identifier associated with a trace collection entity, determine if information associated with a user device indicates authorization for delivery of information to a network operator associated with the public land mobile network identifier and request collected data from the user device only if the information associated with the device indicates authorization for delivery of information to a network operator associated with the public land mobile network identifier.

These and additional embodiments of the invention are described below with particularity.

DETAILED DESCRIPTION

Figure 1:
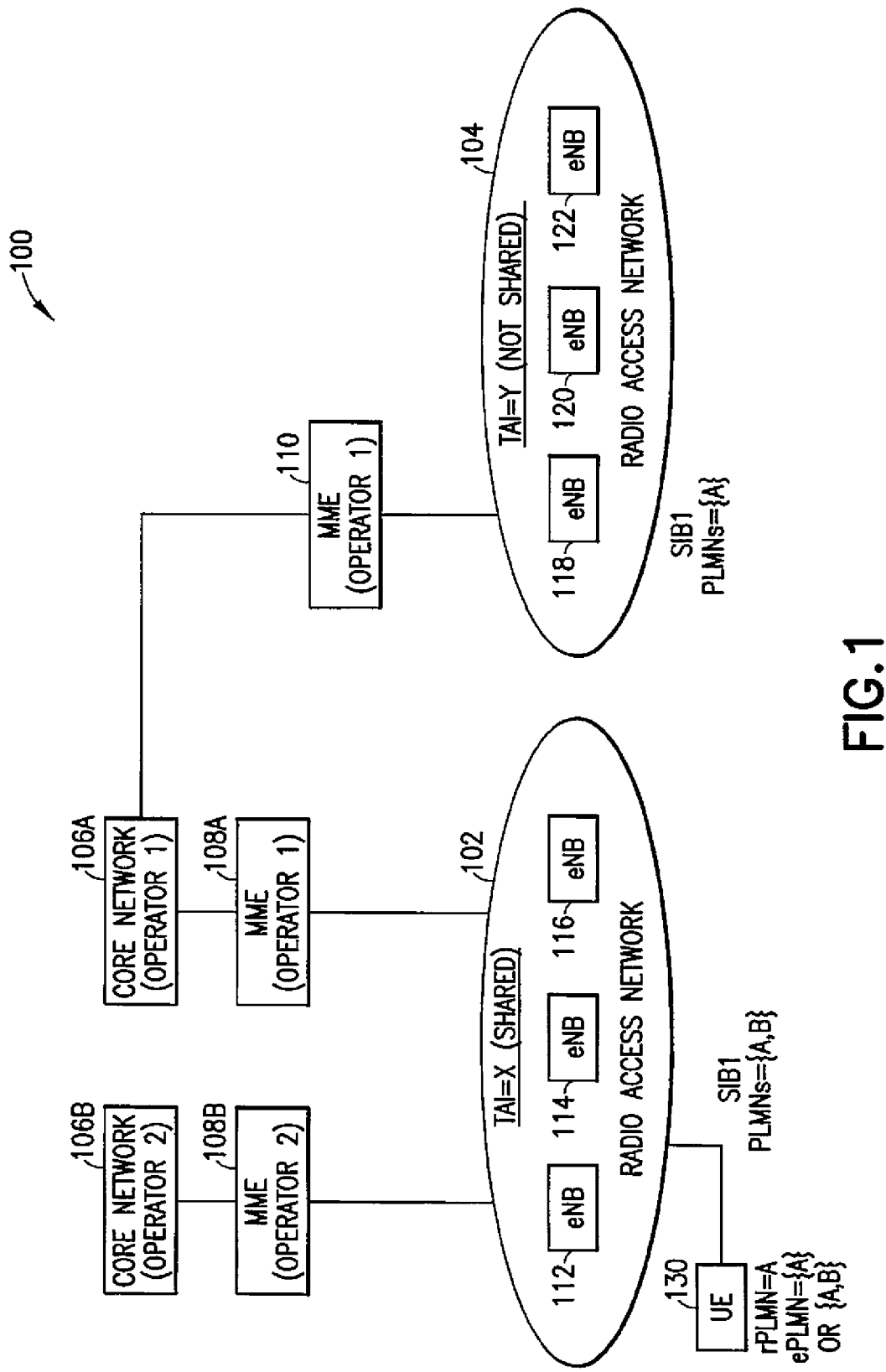
FIG. 1 illustrates an exemplary wireless networking deployment in which various embodiments of the present invention may be practiced.

The present invention recognizes that each customer of a core network (CN) operator sharing a radio access network (RAN) is a customer of that CN operator, and that a customer of a CN operator has agreed to share information with that CN operator, not with some other CN operator. In addition, the invention recognizes that a user device or user equipment (UE) may gather information relating to a RAN of the CN operator providing it service, and that the providing CN operator may not wish to share the information with another CN operator with which it happens to be sharing a RAN.

3GPP release 10 specifications relating to MDT for the LTE and UMTS radio access technologies may be found, for example, in 3GPP TS 32.422, TS 37.320, TS 36.331, and TS 25.331, incorporated herein by reference in their entirety. There are two modes of MDT operation: Immediate MDT and Logged MDT. Both modes of MDT address the gathering of information by or relating to a user device, which in 3GPP LTE and UMTS is frequently referred to as a user equipment or UE, and a base station, frequently implemented in 3GPP LTE operations in the form of an eNodeB (eNB) and in 3GPP UMTS operations in the form of a NodeB.

In Immediate MDT, UE-based information and eNB-based information are collected by the eNB while the UE is in the connected state and conveyed to a data storage server known as a trace collection entity (TCE). In Logged MDT, the UE stores UE-based information in a log while in the idle state, and the log is collected by the eNB and conveyed to a TCE at a later point in time when the UE is in the connected state. Examples of UE-based information are location information such as Global Navigation Satellite System (GNSS) coordinates, or downlink radio measurements such as Reference Signal Received Power (RSRP) or Reference Signal Received Quality (RSRQ). An example of eNB-based information is uplink radio measurements such as Signal to Interference and Noise Ratio (SINR) of the UE.

MDT includes a requirement, detailed in TS 32.422, that an operator must have prior consent from a user before collecting MDT data, in order to comply with user privacy requirements. Embodiments of the present invention recognize that it is highly advantageous to implement MDT in such a way that a UE will not report MDT data collected in operator A's network to an operator B's network. Such an implementation prevents "network spying." Prior-art implementations lack mechanisms for requiring such prior consent in cases in which MDT is deployed in a RAN sharing environment. If a UE is selected or configured for MDT by a RAN sharing partner of the UE's serving operator, then user privacy may be violated because prior-art implementations do not prevent the UE from reporting MDT data to a TCE outside the serving operator's network. In addition, in the case of Logged MDT, that is, applications in which a UE collects data and uploads a data log to a network entity, no mechanism presently exists to prevent a UE from reporting information, which may include proprietary information of the serving operator, to a RAN sharing partner of the serving operator. Embodiments of the invention provide such mechanisms, protecting user privacy and operator proprietary information.

FIG. 1 illustrates a wireless network deployment 100, showing RANs 102 and 104. The RAN 102 is shared by CN operators 1 and 2, operating CNs 106A and 106B, respectively, with the CNs 106A and 106B communicating with the RAN 102 through mobility management entities (MME) 108A and 108B, respectively. Separate MMEs 108A and 108B are illustrated here, but it will be recognized that network deployments may be designed in which shared MMEs are employed. The RAN 104 is not shared by CN operators 1 and 2, but instead belongs to CN operator 1, operating the CN 106A, which communicates with the RAN 104 through the MME 110. The RANs comprise base stations 112, 114, 116, 118, 120, and 122. The base stations are shown implemented here as evolved node B's, or eNBs. Also illustrated is a user equipment (UE) 130 that is illustrated as currently communicating with the RAN 102.

An operator is identified by one or more public land mobile network identifiers (PLMNs). Operator 1 operating CN 106A is identified with PLMN A, and Operator 2 operating CN 106B is identified with PLMN B. The user of UE 130 is a customer of Operator 1, and has agreed to share information with Operator 1 in ways defined by agreements between the user and Operator 1. The user of the UE 130 has not, however, agreed to share information with the Operator 2. As device associated with a customer of Operator 1, the UE 130 is registered with the PLMN A. The UE 130 may therefore share information with the PLMN A according to agreements between its user and Operator 1, but the UE 130 should not share information with the Operator 2 in the absence of an agreement on the part of the user to share such data. Similarly, the UE 130 may receive information during its operation that is proprietary to the Operator 1.

As noted above, the entity to which information gathered by the UE and/or eNB is conveyed is typically a TCE. The TCE may be a data storage server with its own address, and is associated with a particular operator. Typically, a TCE may be associated with one of the CN operators. Thus, in a shared RAN environment, in which the RAN is shared between two or more CN operators, such as Operator 1 and Operator 2, a TCE may be associated with one of the CN operators but not the other, but UEs used by customers of each operator may be operating in the same shared RAN. eNBs operating in the shared RAN and communicating with these UEs may have the capability of collecting information from a UE and sending the information to the TCE. Unless appropriate precautions are taken, information may, for example, be sent to a TCE associated with Operator 2, when the information is collected from a UE whose user is a customer of Operator 1 and who has not consented to share information with Operator 2. The TCE uses an address to transmit and receive data, and this address may simply be an internet protocol (LP) address that does not indicate the particular operator with which the TCE is associated.

Figure 2:
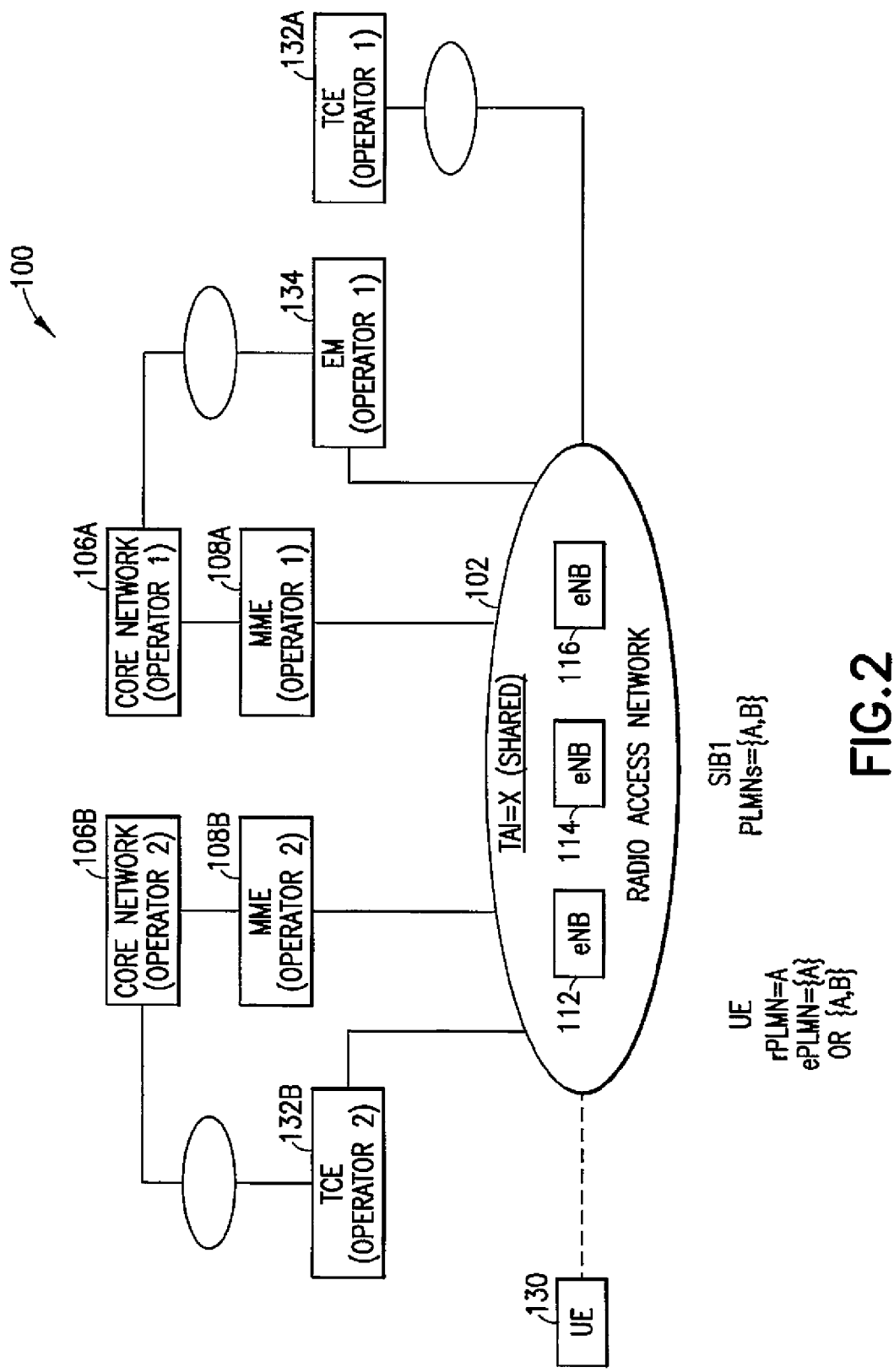
FIG. 2 illustrates additional and alternative details of an exemplary wireless networking deployment in which various embodiments of the present invention may be practiced.

FIG. 2 illustrates elements of the deployment 100 relating to the shared RAN 102. The RAN 102 and its associated elements are shown. The RAN 104 is not illustrated here, but additional elements relating to the shared RAN 102 are an element manager (EM) 134, which manages the elements within the RAN 102, and TCEs 132A and 132B, gathering data on behalf of the Operators 1 and 2, respectively. The EM 134 is controlled by the Operator 1, and performs functions as directed by the Operator 1.

According to an embodiment of the present invention, deployment of MDT makes a number of assumptions relating to RAN sharing:

MDT can be activated by the EM and/or the Operations, Administration and Management (OA&M) system of any of the CN operators. However, not all CN operators will necessary control an EM. For example, in some deployments only the operator that "owns" the RAN controls an EM. This is the case illustrated in FIG. 2. Trace PLMN corresponds to a PLMN of the CN operator activating the trace, such as the PLMN where the EM resides.

User consent is stored in a network element within the CN, such as a Home Subscriber Server (HSS). MDT requires explicit user consent due to user privacy issues. A user may provide consent to any subset, such as only one, of the CN operators. In the present case, the user of the UE 130 has provided consent only to the Operator 1, operating the CN 106A.

A list of PLMNs for which the user consent is valid may be stored, for example, in the HSS. The list may suitably reflect the perspective of one network. For example, the CN 106A knows the consent status of UEs associated with that network. However, in some circumstances, the perspective of one operator may reflect knowledge relating to other operators. In a shared RAN situation, for example, one CN may know the consent status for UEs associated with another CN.

In the deployment 100, the TCE 132A is associated with Operator 1 and the TCE 132B is associated with Operator 2. A UE, such as the UE 130, may receive service from either of the RANs 102 and 104, and may move between the different RANs. The UE 130 is associated with Operator 1 through registration with the PLMN A, and so should not be selected to transfer MDT data to the TCE 132B. However, present mechanisms present situations in which a UE, such as the UE 130, might be selected by network elements to transfer MDT data to the TCE 132B or might deliver to the TCE 132B proprietary data relating to networks operated by the Operator 1.

Turning again to FIG. 1, the following assumptions are made with respect to the relations between the Operators 1 and 2, their respective network elements, and UE 130:

The Operator 1 of the CN 106A is identified by PLMN=A, and the Operator 2 of the CN 106B is identified by PLMN=B. The Operator 1 and the Operator 2 are identified with one or more PLMNs, and they are able to assign one or more PLMNs to their core networks. Each of the CNs 106A and 106B thus uses a single PLMN or a list of PLMNs to identify its association with its respective operator. For simplicity, the PLMNs used in the present example are, as shown and discussed here, the PLMN A used by the CN 106A and the PLMN B used by the CN 106B.

PLMN IDs of available CN operators are broadcast by the eNBs in each cell operated by the eNBs in the plmn-IdentityList IE of the SystemInformationBlockType1 (SIB1) message, as detailed in 3GPP TS 36.331. The first PLMN listed in the plmn-IdentityList IF is referred to as the Primary PLMN. The eNBs operating in shared RAN 102 broadcast PLMN=A and PLMN=B in SIB1, while the eNBs operating in RAN 104 broadcast only PLMN=A.

The UE 130 has registered with PLMN=A.

User consent is true, only for Operator 1. The information collected about UE 130 will be shared with TCE 132A because TCE 132A resides in Operator 1's network.

One mechanism for activating MDT, detailed in TS 32.422, is called area-based MDT, also called management-based MDT. The eNB receives a management-based MDT activation request from, for example, an EM, which contains MDT configuration information such as whether the MDT is for Logged or Immediate MDT. The eNB then selects a UE, based at least in part on the Management Based MDT Allowed indication stored at the eNB in the UE context information. When the Management Based MDT Allowed indication is set to true, the UE is allowed to be selected by the eNB for MDT. The Management Based MDT Allowed indication is set by the MME, and is set to true based at least in part on whether the user associated with the UE has consented to share information with his/her home operator.

Mechanisms according to embodiments of the present invention solve problems that might otherwise be encountered. For example, turning again to FIG. 1, suppose that the Operator 2 desires to collect MDT data about the shared RAN 102. Suppose that eNB 112 has received a management-based MDT activation request associated with PLMN B. Then, the eNB 112 selects UE 130 for MDT since the Management Based MDT Allowed indication stored in the UE context information is set to true. However, the user associated with UE 130 has given his or her consent to PLMN A and not PLMN B, so that activation of MDT for the UE 130 might violate user privacy requirements because consent is not valid for the PLMN B.

In addition, for Logged MDT, embodiments of the present invention prevent "network spying". Turn again to FIG. 1, and suppose that the UE 130 is configured for Logged MDT while present in the RAN 102. Suppose, then, that the UE 130 proceeds to the RAN 104 and continues logging. If the UE then returns to the RAN 102 and delivers its log to the TCE 132B (illustrated in FIG. 2, though not in FIG. 1) it will be reporting data to Operator 2 that is private to Operator 1.

Turn again to FIG. 2. Suppose that the Operator 2 desires to collect MDT data about the shared RAN 102, but the Operator 1 "owns" the RAN and controls the EM 134. Suppose that the EM 134 initiates management-based MDT on behalf of Operator 2. The EM 134 sends an MDT activation request to the eNBs 112, 114, and 116, which includes the IP address of the TCE 132B, which resides within the network of the Operator 2 that wishes to collect and analyze the data, as well as other MDT configuration parameters. The address of the TCE 134 is simply an IP address, and the eNB serving the UE 130 cannot determine from the TCE address which network operator controls the TCE 132B. Also, the eNB serving the UE 130 cannot determine from the PLMN associated with the EM which network operator controls the TCE 132B, since the EM is initiating the MDT on behalf of a different operator.

Therefore, mechanisms according to embodiments of the present invention furnish ways to identify an operator that is to store MDT data so that the eNB may select UE for MDT without violating user privacy requirements, and for a UE to reject configuration or activation for MDT if performing MDT functions would result in undesirable consequences such as violating user privacy requirements or violating requirements for the security of network data.

Suppose that the UE 130 is selected or configured for MDT in the shared RAN 102 as follows.

The UE 130 with registered PLMN (RPLMN) equal to A is in RRC_CONNECTED state within the coverage area of the shared RAN 102. The user has provided consent to Operator 1, who is his or her home network operator and who is associated with CN 106A.

The EM 134 initiates management-based MDT on behalf of the Operator 2. The EM 134 is associated with Operator 1, but the EM directs MDT operations to be configured to deliver data to the TCE 132B associated with Operator 2. The eNB 112, for example, receives a MDT Activation Request, where the trace PLMN (PLMN associated with the EM) is equal to A. The UE 130 is selected or configured for management-based MDT by the eNB 112 due, at least in part, to a Management Based MDT Allowed indication stored in the UE context being set to TRUE. The UE 130 stores parameters indicating whether it will participate in MDT data gathering and the nature of the operations in which it will engage.

A potential user privacy issue exists since the UE 130 is selected for management-based MDT with data to be delivered to the TCE 132B, which resides in the network of the Operator 2, but the user of the UE 130 has given consent only to the Operator 1. Therefore, in the absence of a positive indication of consent for collection by other operators identified by other PLMNs, it may be presumed that a user's consent to MDT collection is valid only for its home network operator, such as the operator identified by its home public land mobile network (HPLMN) and equivalent home public land mobile networks (EHPLNs). As noted above, in a RAN sharing environment, there is potential for UE to be selected for management-based MDT by an operator different than the home network operator, which may result in a violation of user privacy.

In addition, a potential network spying issue exists if a UE is selected for Logged MDT, then enters RRC_IDLE state, reselects to the coverage area of Operator 1 (TAC=Z), and later returns to the shared coverage area. In this case, the RPLMN of the UE never changes, so the UE continues measurement logging and may report a measurement log to TCE 132B associated with Operator 2 which contains measurements from Operator 1's network.

In one embodiment of the invention, therefore, the Management Based MDT Allowed IE is valid only for the UE's serving PLMN. Thus, the eNB 112 would consider the UE 130 eligible for MDT selection only if the TCE to which data is to be delivered is under the control of the same operator who controls the UE's serving PLMN. In the present example, therefore, the eNB 112 receives information indicating the PLMN associated with the TCE 132B and recognizes that it resides in PLMN B. The eNB 112 would also be aware that the serving PLMN of the DE 130 is A, and that the user consent indicated by the Management Based MDT Allowed IE is invalid for the proposed initiation because the TCE is not controlled by the same operator as the serving PLMN.

In another embodiment of the invention, when an eNB such as the eNB 112 receives a management-based MDT activation request, it determines the operator associated with the network where the MDT data is to be stored, such as through receiving the PLMN ID of the operator associated with the TCE. This information is configured to the eNB through OA&M, or contained in the MDT activation request, for example as an explicit TCE PLMN ID, or implicitly as the Trace PLMN ID if it can be assumed that the TCE is always associated with the same operator as the EM that initiated the MDT activation request, or implicitly as the Primary PLMN of the cell being operated by the eNB if it can be assumed that only the operator associated with the Primary PLMN (e.g. the RAN "owner") is allowed to initiate MDT. In the case of the TCE 132B, the PLMN ID associated with the TCE is the ID PLMN=B. When selecting UEs to participate in MDT, the eNB verifies that the UE user has given consent to the operator associated with the element in which the MDT data is to be stored. The PLMN ID identifying the operator associated with the TCE is compared to the PLMN or PLMNs for which the user of the UE has given consent. In some contexts, this may simply be the PLMN of the operator serving the UE or a related PLMN, while in other contexts a user may be provided mechanisms to consent to data collection by other operators. In one exemplary embodiment, the UEs equivalent PLMN (EPLMN) list, detailed in 3GPP specifications such as TS 24.301, incorporated herein by reference in its entirety, is examined to identify the PLMN or PLMNs identifying operators for which consent has been given. In another exemplary embodiment, a list of PLMNs for which user consent is valid is provided to the eNB along with the Management Based MDT Allowed indication (e.g. when Management Based MDT Allowed is set to true, there is an additional list of PLMNs for which the Management Based MDT Allowed is valid). If the PLMN identifying the operator associated with the TCE does not match a PLMN for which consent has been given, the UE will not be selected or configured for MDT, while otherwise, the UE is selected.

In another embodiment of the invention, a UE, such as the UE 130, being configured for logged MDT, such as by receiving an MDT configuration message, determines the network in which the MDT data is to be stored. This information may, for example, be received in the MDT configuration. The UE will reject or ignore the configuration if user consent has not been given for collection by the operator associated with the TCE. Otherwise, the configuration is accepted. This is true only for logged MDT, because in immediate MDT, the UE is directly triggered to make measurements, and these measurements are reported immediately.

Turning again to the case of logged MDT discussed above, suppose that the UE 130, with RPLMN=A, is configured for Logged MDT within the RAN 104, which is the non-shared RAN within the coverage area of the CN 106A associated with the Operator 1. The trace PLMN equals A, since the EM initiating the MDT activation request is associated with PLMN=A. Now, suppose that the UE 130 subsequently reselects to the coverage area of the shared RAN, that is, the RAN 102.

Now, suppose that the UE 130 transitions to an RRC_CONNECTED state in the shared RAN 102. The UE 130 will include the logMeasAvailable 1E as described in TS 36.331 to indicate that a measurement log is stored in the UE and available for retrieval by the network, and the measurement log can be retrieved by an eNB operating within the RAN 102. The UE includes the logMeasAvailable TF only if the UE's RPLMN is equal to the RPLMN at the point when the MDT configuration was received, referred to as the MDT PLMN, or a list of PLMNs indicating, among other things, the PLMNs where the log can be retrieved, referred to as the MDT PLMN List. Suppose, too, that the Operator 2 associated with the CN 106B is authorized to manage MDT within the shared RAN 102 (e.g. if the Operator 2 is the RAN owner). When an eNB such as the eNB 112 requests the measurement log from the UE 130, the eNB does not know whether the UE 130 was configured for MDT while within the shared RAN 102, or while outside the shared RAN 102. In the present example, in which the log was at least in part collected outside of the shared RAN 102, the log would be retrieved by elements associated with an operator different than the operator who configured the UE 130 for MDT, resulting in potential user privacy and network spying issues.

After retrieving the log, the eNB can determine that the log should not be delivered to the Operator 2 (for example, by checking the trace PLMN and/or TCE ID in the log), but the only action it can then take is to discard the log. Such a mechanism may protect data associated with the Operator 1, but it deprives the Operator 1 of the benefit of collecting the log.

In a RAN sharing environment, a UE previously configured for Logged MDT in a non-shared RAN may report the measurement log to a different operator in the shared RAN, resulting in loss of the log as well as potential user privacy and network spying issues. The basic problem is that the UE, although aware that there is RAN sharing (through the presence of multiple PLMN identifiers in SIB1), does not know which Operator will retrieve the measurement log.

According to one exemplary embodiment of the invention, therefore, a UE will include the logMeasAvailable IE only if the RPLMN matches the MDT PLMN and/or MDT PLMN List, and the RPLMN is the Primary PLMN of the cell, that is, of the eNB currently serving the UE. In other embodiments, alternative or additional criteria for inclusion by the UE of the logMeasAvailable IE may include:

the Primary PLMN of the cell matches the UE's RPLMN;
the Primary PLMN of the cell matches the UE's RPLMN or a PLMN in the UE's EPLMN List;
the Primary PLMN of the cell matches a PLMN in a list configured to the UE at the time of Logged MDT configuration.

As noted, according to one or more embodiments of the invention, each eNB operating in an RAN is aware of the PLMN ID associated with the TCE with which it communicates. An eNB receiving a logMeasAvailable IF from a UE requests the log from the UE only if the PLMN ID of the TCE matches the registered/serving PLMN ID of the UE. In another exemplary embodiment, the eNB may, alternatively or in addition, request the log from the UE only if the PLMN ID of the operator associated with the TCE matches the registered/serving PLMN ID or a PLMN ID in the UE's EPLMN list. In the present example discussed here, the eNB 112 if collecting MDT data for the TCE 132B, would not request the log from the UE 130.

According to another embodiment of the invention, a UE that is initially configured for Logged MDT notes the PLMN ID of the TCE at the time of initial configuration. When the UE transitions to an RRC_CONNECTED state, or to another state in which it includes the logMeasAvailable IF, an eNB receiving the logMeasAvailable and seeking to collect the log will respond with the PLMN ID of the TCE that is to collect the log data. If the PLMN ID of the TCE does not match the PLMN ID of the TCE at the time of initial configuration, the UE will not deliver the log, but instead will wait until it receives a request that includes a PLMN ID of a TCE that matches the PLMN ID of the TCE at the time of initial configuration.

Figure 3:
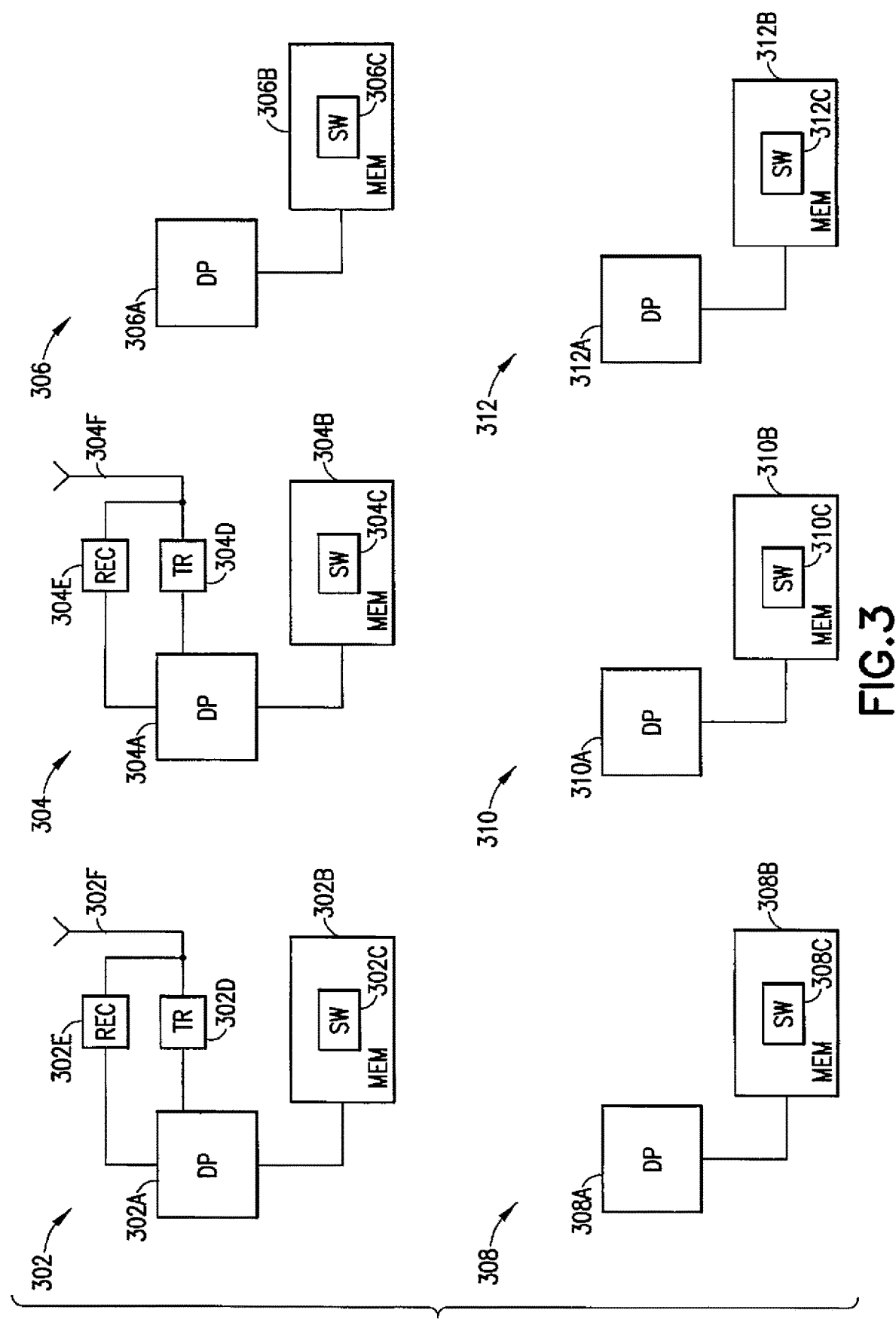
FIG. 3 illustrates various elements suitable for the practice of various embodiments of the present invention.

FIG. 3 illustrates exemplary network elements that may be used in a deployment such as the deployment 100. Elements include a UE 302, a base station 304, implemented as an eNB, a core network 306, a MME 308, a TCE 310, and an EM 312. The UE 302 comprises a data processor 302A, memory 302B, with the memory 302B suitably storing software 302C. The UE 302 also comprises a transmitter 302D, receiver 302E, and antenna 302F. Similarly, the base station 304 comprises a data processor 304A, memory 304B, with the memory 304B suitably storing software 304C. The base station 304 also comprises a transmitter 304D, receiver 304E, and antenna 304F. The elements of core network 306 each comprise a data processor 306A, memory 306B, with the memory 306B suitably storing software 306C. The core network 306 may communicate with other elements through one or more interfaces that need not be, and typically are not, wireless, but instead may be expected to be characteristic of communication between a core network and the elements it controls. The specifics of the interface between the core network 306 and the illustrated elements are omitted in FIG. 3 for simplicity of illustration. Similarly, the MME 308 comprises a data processor 308A, memory 308B, with the memory 308B suitably storing software 308C, and may also communicate over one or more wired interfaces. The TCE 310 comprises a data processor 310A, memory 310B, with the memory 310B suitably storing software 310C, and may also communicate over one or more wired interfaces. Similarly, the EM 312 comprises a data processor 312A, memory 312B, with the memory 312B suitably storing software 312C, and may communicate over one or more wired interfaces.

At least one of the software 302C-312C stored in memories 302B-312B is assumed to include program instructions (software (SW)) that, when executed by the associated data processor, enable the electronic device to operate in accordance with the exemplary embodiments of this invention. That is, the exemplary embodiments of this invention may be implemented at least in part by computer software executable by the DP 302A-312A of the various electronic components illustrated here, with such components and similar components being deployed in whatever numbers, configurations, and arrangements are desired for the carrying out of the invention. Various embodiments of the invention may be carried out by hardware, or by a combination of software and hardware (and firmware).

The various embodiments of the UE 302 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 304B-312B may be of any type suitable to the local technical environment and may be implemented using any suitable data storage technology, such as semiconductor based memory devices, flash memory, magnetic memory devices and systems, optical memory devices and systems, fixed memory and removable memory. The data processors 302A-312A may be of any type suitable to the local technical environment, and may include one or more of general purpose computers, special purpose computers, microprocessors, digital signal processors (DSPs) and processors based on multi-core processor architectures, as non-limiting examples.

Figure 4:
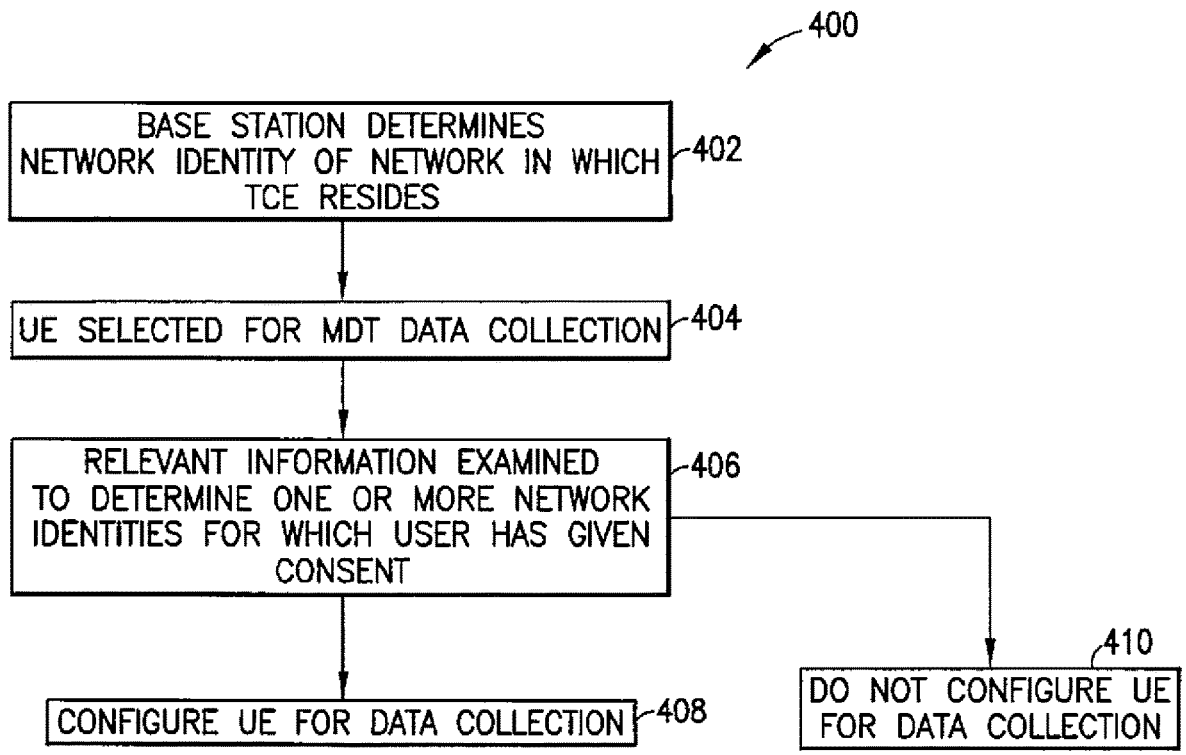
FIG. 4 illustrates a process according to an embodiment of the present invention.

FIG. 4 illustrates a process 400 of data collection according to an embodiment of the present invention. At step 402, a network element, such as a base station, determines at least one network identity of a network in which a data storage server, such as a TCE, resides. Determination may be accomplished, for example, by configuration of the information to the eNB through OA&M, or the information may be included in an MDT activation request, for example, as an explicit TCE PLMN ID. Alternatively, the information may be included implicitly in the Trace PLMN ID if it can be assumed that the TCE is always associated with the same Operator as the EM that initiated the MDT activation request, As a further alternative, the information may be determined implicitly as the primary PLMN of the cell being operated by the eNB if it can be assumed that the operator associated with the Primary PLMN, for example, the RAN "owner", is the only operator allowed to initiate MDT.

At step 404, a candidate device, such as a UE, is selected for MDT data collection based at least in part on whether the Management Based MDT Allowed information stored within the UE context in the eNB is set to true. At step 406, information associated with candidate device is examined to determine one or more network identities of networks for which a user of the UE has given consent for data collection. The information associated with the candidate device may be, for example, the UE's registered/serving PLMN (provided by the candidate device during connection establishment or received from a source cell during handover). If the network identity of a storage server matches a network identity of a network for which consent has been received, the process proceeds to step 408 and the UE is configured for data collection; otherwise, the process proceeds to step 410 and the UE is not configured for data collection. Mechanisms for determination by the eNB of the PLMN for which user content associated with Management Based MDT Allowed=true may include, for example, identification of the PLMN of the operator serving the UE or a related PLMN. In other contexts, a user may be provided mechanisms to consent to data collection by other operators. In one exemplary embodiment, the UEs equivalent PLMN or EPLMN list, detailed in 3GPP specifications such as TS 24.301, is examined to identify the PLMN or PLMNs identifying operators for which consent has been given. In another exemplary embodiment, a list of PLMNs for which user consent is valid is provided to the eNB along with the Management Based MDT Allowed indication. For example, when Management Based MDT Allowed is set to true, there may be an additional list of PLMNs for which the Management Based MDT Allowed is valid.

Figure 5:
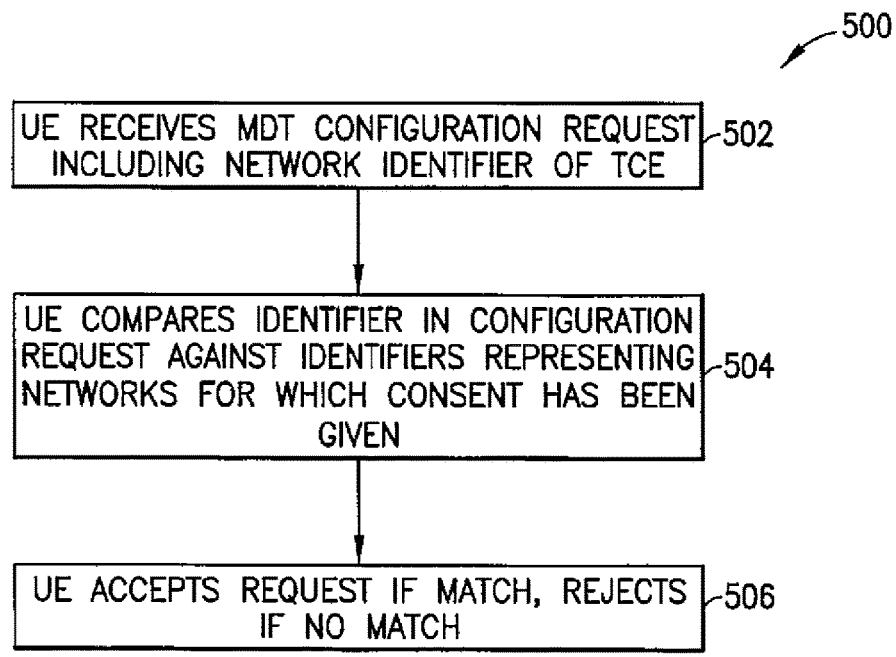
FIG. 5 illustrates a process according to an alternative embodiment of the present invention.

FIG. 5 illustrates an alternative process 500 of data collection according to an embodiment of the present invention. At step 502, a UE capable of data collection receives an MDT configuration request. The configuration request suitably includes a network identifier for a data storage server to which the data is to be delivered. At step 504, the UE compares the network identifier against a set of network identifiers for which consent has been given for data collection by a user of the UE. At step 506, the UE accepts the request if a match is detected and rejects the request if no match is detected.

Figure 6:
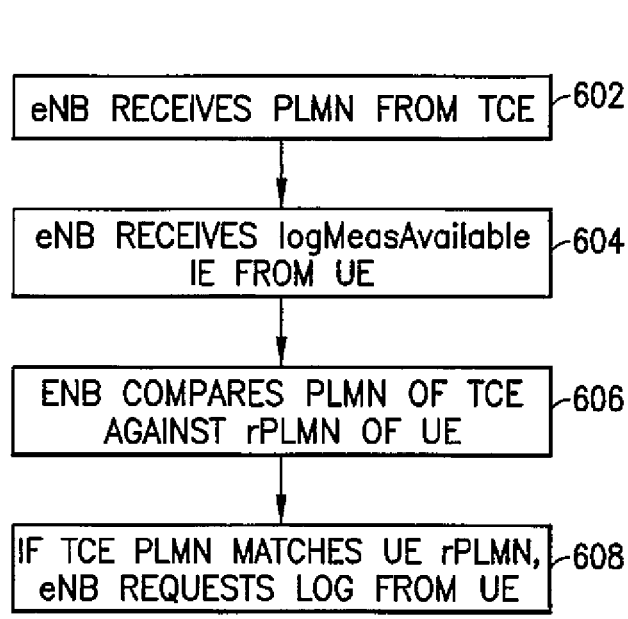
FIG. 6 illustrates a process according to an alternative embodiment of the present invention.

FIG. 6 illustrates an alternative process of data collection according to an embodiment of the present invention. At step 602, an eNB collects and stores a PLMN ID associated with a TCE to which it is to deliver data log information. The way the eNB determines the PLMN ID associated with the TCE may include one or more of the mechanisms described above. For example, the information may be configured to the eNB through OA&M, or contained in the MDT activation request, for example, as an explicit TCE PLMN ID, or implicitly as the Trace PLMN ID if it can be assumed that the TCE is always associated with the same operator as the EM that initiated the MDT activation request, or implicitly as the Primary PLMN of the cell being operated by the eNB if it can be assumed that only the operator associated with the Primary PLMN (e.g. the RAN "owner") is allowed to initiate MDT.

At step 604, the eNB receives a logMeasAvailable IE from a UE. At step 606, the eNB performs appropriate comparisons to determine if the log should be requested from the UE. For example, the eNB may compare the PLMN ID associated with the TCE against the registered/serving PLMN of the UE, and may also compare the PLMN ID associated with the TCE against any of the PLMNs in the EPLMN list of the UE. Alternatively or in addition, the criteria may be that the Primary PLMN of the cell matches the UE's RPLMN, that the Primary PLMN of the cell matches the UE's RPLMN or a PLMN in the UE's EPLMN List, that the Primary PLMN of the cell matches a PLMN in a list configured to the UE at time of Logged MDT configuration, or other appropriate criteria chosen to insure that the PLMN of the TCE to which the log is delivered is associated with an operator authorized to receive it.

At step 608, the eNB requests the log from the UE only if the PLMN ID associated with the TCE matches the registered/serving PLMN ID of the UE or other suitable criteria described above.

Figure 7:
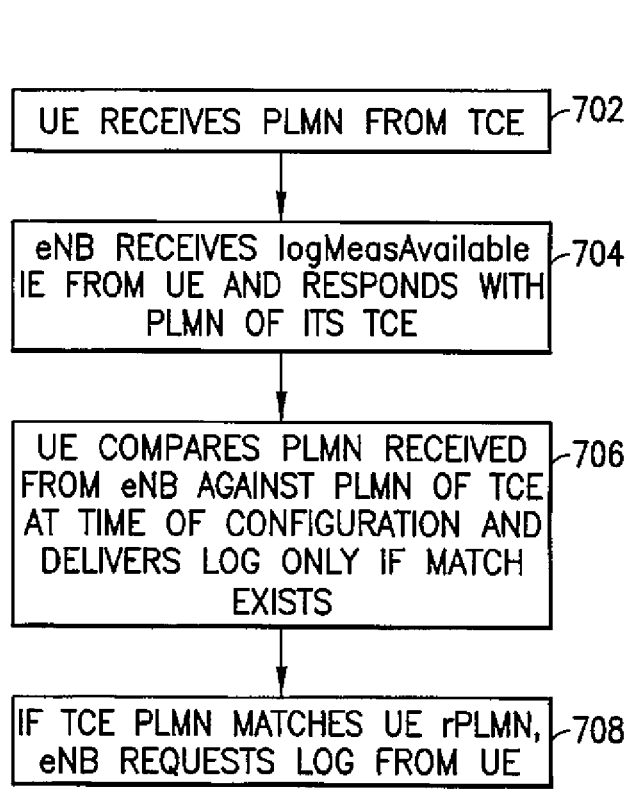
FIG. 7 illustrates a process according to an alternative embodiment of the present invention.

FIG. 7 illustrates an alternative process of data collection according to an embodiment of the invention. At step 702, a UE that is initially configured for MDT notes the PLMN ID of the TCE at the time of initial configuration. At step 704, an eNB receiving the logMeasAvailable IE of the UE and seeking to collect the log responds with the PLMN ID of the TCE that is to collect the log data. At step 706, the UE delivers the log if the PLMN ID of the TCE matches the PLMN of the TCE at the time if initial configuration, but does not deliver the log if there is no match.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE and LTE-A systems, it should be appreciated that the exemplary embodiments of this invention are not limited for use with only these particular types of wireless communication systems, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described network elements, parameters and information elements are not intended to be limiting in any respect, as these network elements, parameters and information elements may be identified by any suitable names. Further, the various names assigned to different elements, such as MME, EM, HSS, TCE, and the like, are not intended to be limiting in any respect, as these various interfaces may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   receiving, by a network device, a data collection activation message, wherein the data collection is associated with a trace collection entity;
   determining a public land mobile network identifier of a network where the trace collection entity resides;
   determining a public land mobile network identifier of the network for whose operator a consent status of a candidate user device indicates consent for data collection, wherein the consent status of the user device is associated with the network and stored in a network element of the network;
   determining a match of the public land mobile network identifier of the network where the trace collection entity resides and the public land mobile network identifier of the network for which the consent status stored in the network element indicates consent for the candidate user device on behalf of a network operator of the network; and
   based on the match, configuring the candidate user device for data collection per the data collection activation message.

2. The method of claim 1, wherein the data collection activation message is a minimization of drive tests activation message.

3. The method of claim 1, wherein the public land mobile network identifier of the network on behalf of whose operator the candidate user device has given consent for data collection is at least one of:
   the user device's serving public land mobile network,
   the user device's home public land mobile network identifier,
   the public land mobile network identifier in the an equivalent public land mobile network list of the user device, and
   the public land mobile networks in a User Consent public land mobile network list.

4. The method of claim 3, wherein the User Consent public land mobile network list is a configurable list from a mobility management entity.

5. The method of claim 4, wherein the configurable list is a subset of equivalent public land mobile networks.

6. An apparatus comprising:
   at least one processor;
   memory storing computer program code;
   wherein the memory storing the computer program code is configured to, with the at least one processor, cause the apparatus to at least:
   receive a data collection activation message, wherein the data collection is associated with a trace collection entity;
   determine a public land mobile network identifier of a network where the trace collection entity resides;
   determine a public land mobile network identifier of the network for which a consent status of a candidate user device indicates consent for data collection on behalf of a network operator of the network, wherein the consent status of the user device is associated with the network and stored in a network element of the network;
   determine a match of the public land mobile network identifier of the network where the trace collection entity resides with the public land mobile network identifier of the network for which the consent status stored in the network element indicates consent for the candidate user device; and
   based on the match, configure the candidate user device for data collection per the data collection activation message.

7. The apparatus of claim 6, wherein the data collection activation message is a minimization of drive tests activation message.

8. The apparatus of claim 6, wherein the public land mobile network identifier of the network for which the candidate user device has given consent for data collection is at least one of:
   the user device's serving public land mobile network,
   the user device's home public land mobile network identifier,
   the PLMNs in the user device's equivalent public land mobile network list, and
   the public land mobile networks in a User Consent public land mobile network list.

9. The apparatus of claim 8, wherein the User Consent public land mobile network list is a configurable list from a mobility management entity.

10. The apparatus of claim 9, wherein the configurable list is a subset of equivalent public land mobile networks.

11. A method comprising:
    determining a public land mobile network identifier associated with a trace collection entity;
    determining a public land mobile network identifier associated with a user device and stored in a network element of a network associated with the public land mobile network identifier indicates authorization by a user of the user device for delivery of information to a network operator of the network; and
    requesting collected data from the user device only if the a public land mobile network identifier associated with the device indicates authorization by the user of the user device for delivery of information to the network operator associated with the public land mobile network identifier, wherein the authorization is based on a determined match of the public land mobile network identifier associated with the trace collection entity and the public land mobile network identifier of the network which indicates authorization by the user of the user device.

12. The method of claim 11, wherein the user device is a user device from which a logMeasAvailable information element has been received.

13. The method of claim 11, wherein the public land mobile network identifier associated with the trace collection entity is determined based on at least one of operations, administration, and maintenance or an indication by a minimize drive time activation request.

14. The method of claim 11, wherein the public land mobile network identifier associated with the trace collection entity is at least one of:
   a public land mobile network identifier always associated with the trace collection entity; and
   a primary public land mobile network identifier associated with a cell supporting a user device from which data is to be requested.

15. The method of claim 11, wherein determining if information associated with a user device indicates authorization for delivery of information to a network operator associated with the public land mobile network identifier is based on public land mobile network identifier information associated with the user device.

16. The method of claim 15, wherein the public land mobile network identifier information associated with the user device comprises at least one of:
   an identifier of the user device's home public land mobile network identifier;
   a registered public land mobile network identifier associated with the user device,
   an equivalent public land mobile network identifier associated with the user device,
   a public land mobile network identifier in a minimization of drive tests public land mobile network list associated with the user device, and
   at least one public land mobile network identifier associated with user consent for data collection by the user device.

17. An apparatus comprising:
   at least one processor;
   memory storing computer program code;
   wherein the memory storing the computer program code is configured to, with the at least one processor, cause the apparatus to at least:
      determine a public land mobile network identifier associated with a trace collection entity;
      determine a public land mobile network identifier associated with a user device and stored in a network element of a network associated with the public land mobile network identifier indicates authorization for delivery of information to a network operator of the network, wherein the authorization is based on a determined match of the public land mobile network identifier associated with the trace collection entity and the public land mobile network identifier of the network which indicates the authorization; and
      request collected data from the user device only if the information associated with the device indicates authorization by a user of the user device for delivery of information to a network operator associated with the public land mobile network identifier.

18. The apparatus of claim 17, wherein the user device is a user device from which a logMeasAvailable information element has been received.

19. The apparatus of claim 17, wherein the public land mobile network identifier associated with the trace collection entity is determined based on at least one of operations, administration, and maintenance or an indication by a minimize drive time activation request.

20. The apparatus of claim 17, wherein the public land mobile network identifier associated with the trace collection entity is at least one of:
   a public land mobile network identifier always associated with the trace collection entity; and
   a primary public land mobile network identifier associated with a cell supporting a user device from which data is to be requested.

21. The apparatus of claim 17, wherein determining if information associated with a user device indicates authorization for delivery of information to a network operator associated with the public land mobile network identifier is based on public land mobile network identifier information associated with the user device.

22. The apparatus of claim 21, wherein the public land mobile network identifier information associated with the user device comprises at least one of:
   an identifier of the user device's home public land mobile network identifier;
   a registered public land mobile network identifier associated with the user device,
   an equivalent public land mobile network identifier associated with the user device,
   a public land mobile network identifier in a minimization of drive tests public land mobile network list associated with the user device, and
   at least one public land mobile network identifier associated with user consent for data collection by the user device.

* * * * *